Aug. 9, 1960          R. E. JOHNSON ET AL          2,948,767
                    GAS-ACTIVATED PRIMARY CELLS
Filed Aug. 3, 1956                              2 Sheets-Sheet 1

INVENTORS,
RICHARD E. JOHNSON,
WILLIAM G. DARLAND, JR.,
CARL A. GRULKE,
NELSON C. CAHOON,
HUGH F. SCHAEFER

BY John F. Hohmann
                    ATTORNEY

Aug. 9, 1960 R. E. JOHNSON ET AL 2,948,767
GAS-ACTIVATED PRIMARY CELLS
Filed Aug. 3, 1956 2 Sheets-Sheet 2

INVENTORS,
RICHARD E. JOHNSON,
WILLIAM G. DARLAND, JR.,
CARL A. GRULKE,
NELSON C. CAHOON,
HUGH F. SCHAEFER

BY John F. Hohman
ATTORNEY

United States Patent Office 2,948,767
Patented Aug. 9, 1960

2,948,767
GAS-ACTIVATED PRIMARY CELLS

Richard E. Johnson, Cleveland, William G. Darland, Jr., Parma, Carl A. Grulke, Berea, Nelson C. Cahoon, Fairview Park, and Hugh F. Schaefer, Lakewood, Ohio, assignors to Union Carbide Corporation, a corporation of New York Filed Aug. 3, 1956, Ser. No. 601,865

22 Claims. (Cl. 136—90)

This invention relates to gas-activated primary cells and refers more particularly to batteries of such cells especially suited to use at very low temperatures.

Gas-activated batteries offer certain service advantages not attainable with conventional primary or secondary type batteries. Frequently such gas-activated systems are of the deferred action type providing indefinite shelf life and yet being available for use upon demand. Gas-activated batteries are not subject to unintended activation by external forces applied to apparatus in which the batteries may be used and thus possess an advantage over deferred action batteries activated by liquid. Because of this advantage, as well as others, there is a demand for gas-activated batteries and particularly for such batteries capable of use at very low temperatures such as below —30° F.

It is the principal object of this invention to satisfy this demand. More specifically, it is an important object of the invention to provide a primary galvanic cell activatable by a gas at temperatures below —30° F. Another object is the provision of a primary galvanic cell which is gas activated and completely dry until activated by gas.

These and other objects are achieved by the invention which will be described with reference to the accompanying drawing in which.

In accordance with the invention a primary galvanic cell activatable by a gas at a temperature below —30° F. comprises a consumable metal anode; a metal oxide depolarizer-cathode; a separator containing materials which react with activating gas to provide ionically conductive electrolyte, such separator being adjacent to such anode; an electronically conductive cathode current collector and an electrolyte-wettable diffuser element adjacent to said cathode current collector and capable of providing a path for activating gas to said separator and electrolyte-forming materials.

Figure 1:
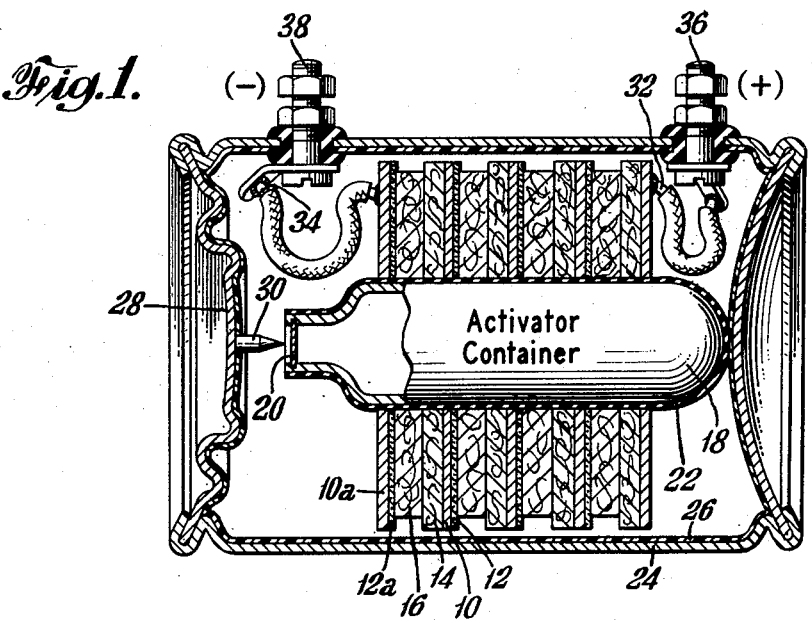
Fig. 1 is a vertical section of a battery of cells embodying the invention and housed in an enclosed container.
Figure 2:
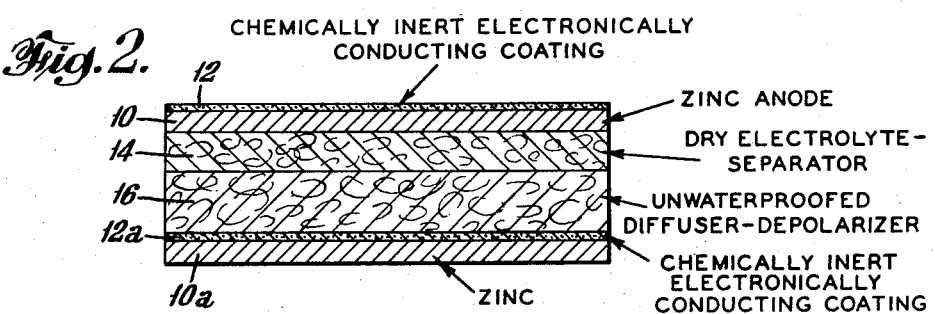
Fig. 2 is an enlarged vertical section of a portion of a cell embodying the invention and of the type used in the battery of Fig. 1.

Referring particularly to Figs. 1 and 2 of the drawing, the cell of the invention may comprise a zinc anode 10 to one side of which may be applied a conductive coating 12 of carbon to serve as the cathode collector for an adjacent cell. Adjacent to the other side of the zinc anode 10 is a dry separator 14 containing electrolyte-forming materials. The separator may be formed of any bibulous separator material such as filter paper or the like. Adjacent to the separator 14 is a diffuser element 16 fabricated of paper or non-conductive textile fibers and containing distributed therein finely-divided metal oxide depolarizer. The cell is completed by the conducting carbon coating 12a applied to the surface of a second anode element 10a.

As indicated in Fig. 1, the cell elements just described may be annular. A number of cells, four being shown for purposes of illustration, are arranged in series contact to form a battery and a metal ampule 18 containing compressed activating gas and provided with a frangible diaphragm 20 is placed within the central aperture of the annular cells elements. The ampule 18 is provided with an insulating sheath 22 suitably of a corrosion-resisting plastic material. The battery and ampule 18 are arranged in a sealed container 24 of metal provided with a corrosion-resisting lining 26. One end cover 28 of the container 24 is provided with a piercing point 30 adapted to rupture the frangible disc 20 of the ampule 18 when it is desired to activate the battery. Appropriate positive 32 and negative 34 leads are provided from the battery to external terminals 36 and 38, respectively.

Figure 3:
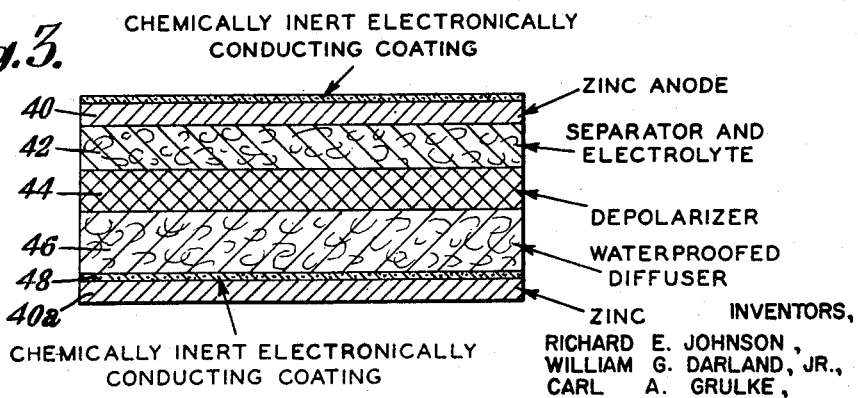
Fig. 3 is a view similar to Fig. 2 of a modified cell embodying the invention.

A somewhat different cell structure is illustrated in Fig. 3. In this case, adjacent to a zinc anode 40, is a separator 42 moistened with electrolyte. Adjacent to the separator 42 is a depolarizer element 44 containing metal oxide depolarizer. A diffuser element 46 adapted to provide a path for gas to the depolarizer 44 is adjacent thereto and the cell is completed by the conductive carbon coating 48 applied to one side of another zinc anode 40a.

Figure 4:
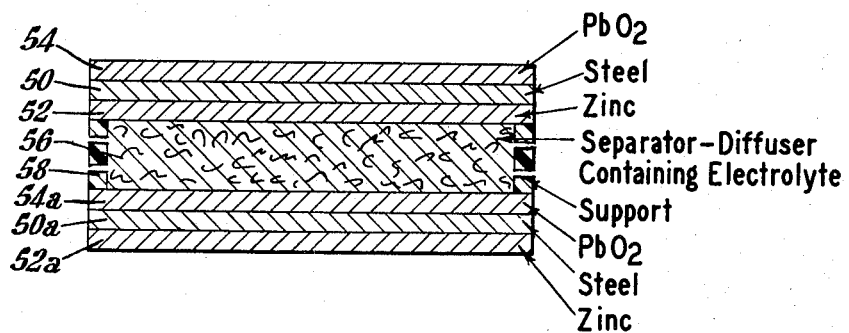
Fig. 4 is a similar view of another modified cell embodying the invention.

Fig. 4 of the drawing depicts still another modified cell structure embodying the invention. In this structure a steel (or other suitable metal) support 50 is provided on one side with a layer 54 of depolarizing oxide, for example lead dioxide, and on the other side with a layer 52 of anode metal, preferably zinc. The resulting duplex electrode is placed with its anode layer 52 in contact with a fibrous separator 56 containing electrolyte-forming materials, and the depolarizer layer 54a of another duplex electrode is placed adjacent to the other side of the separator 56. The separator 56 in this construction serves also as the gas diffuser for the cell. An apertured support member 58, suitably of plastic, is placed in the cell so as to prevent the separator 56 from being crushed.

In the cell of the invention the anode may be formed of any of a number of metals. Among those which have proved satisfactory are aluminum, magnesium, cadmium, manganese, iron, nickel and lead in addition to zinc. Economic considerations make zinc and lead the most desirable of these, zinc being preferred. Similarly, any of a number of depolarizers may be used. Oxygen-yielding compounds of metals, such as their oxides are conventional depolarizers. Manganese dioxide, lead dioxide, copper oxide, chromic doxide, silver oxide, silver peroxide and vanadium pentoxide have proved useful in the invention. Of these manganese dioxide and lead dioxide are preferred.

Electrolyte-forming materials suitable for use in the invention include hydrated inorganic salts, alkaline hydroxides and organic compounds having short chain carboxyl, hydroxyl or amino groups. Organic compounds which are useful in the invention include saturated dicarboxylic acids of the formula HOOC—R—COOH 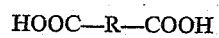

where R is an alkyl radical of up to 5 carbon atoms or an aryl radical of not more than 12 carbon atoms. Specific compounds are crotonic acid and oxalic acid. Dihydroxy phenols, resorcinol and catechol are also samples of organic materials which may be used. Inorganic salts include chlorides, phosphates, fluorides, nitrates, sulfates, and carbonates of manganese (ous), iron (ous), nickel (ous), cobalt (ous), alkali metals, magnesium, calcium, strontium, barium, zinc, cadmium and aluminum. Of the inorganic salts the chlorides are generally preferred and the most desirable of these at the time of writing is manganous chloride ($MnCl_2 \cdot 4H_2O$). It is emphasized that all of these salts must contain water of hydration for use in the invention.

The activating gas used in the invention is selected from the group consisting of boron trifluoride and silicon tetrafluoride. Both of these gases have high vapor pressures at low temperatures and readily form strong co-ordination complexes. Batteries may be activated by either at temperatures well below −30° F. Of the two, boron trifluoride is preferred.

As above indicated, a duplex electrode can be used, and preferably is used, in the cell of the invention, the example shown in Figs. 1 to 3, inclusive comprising a sheet of zinc coated on one side with a conductive carbon coating. Another convenient way of forming electrodes for the cell of the invention (as shown in Fig. 4 and described above) is to provide an electrode-supporting member of thin steel coated on one side, suitably by electro-deposition, with zinc and on the other with lead dioxide which serves as cathode and depolarizer. Electrodes so formed are used in the cell of the invention with the zinc side adjacent to a separator containing electrolyte-forming material.

The separator utilized in the cell of the invention may be made of paper as above indicated. To provide therein electrolyte-forming elements any of a number of techniques may be employed. A suitable one is to calender or felt an intimate mixture of paper fibers and finely-ground crystals of the electrolyte-forming material. For example, utilizing manganese chloride ($MnCl_2 \cdot 4H_2O$) the paper fibers may be mixed with crystals of the salt derived from a saturated solution. The mixture, which is moist, is dried in an oven to remove excess water to make the material dry to the touch. By such procedure a dry separator containing about 90% by weight manganese chloride ($MnCl_2 \cdot 4H_2O$) may be prepared quite easily. The separator so produced is porous and permits ready gas diffusion throughout its mass. In this respect separators so prepared have been found to be superior to separators prepared by immersion of bibulous paper in aqueous solution of the electrolyte-forming salt although separators prepared by immersion may be used if desired.

In cells embodying the invention utilizing a dry separator and electrodes of the type described, the diffuser element may be composed of any convenient gas-permeable material such as a porous ceramic material, porous carbon material, fibrous paper or textile materials which will permit ready access of such gas to the separator and its contained electrolyte-forming material. The diffuser element must be conductive, either electronically conductive, or electrolytically conductive. Electrolytic conductivity may be assured by incorporating electrolyte-forming material in the diffuser. For convenience and economy, ordinary blotting paper is satisfactory for use as a diffuser element when rendered conductive. A preferred diffuser is that described and claimed in the application of Carl A. Grulke, Serial No. 594,628, filed June 28, 1956. The diffuser element is placed in the cell adjacent to the separator and the cell is completed by placing a duplex electrode with its cathode current collector surface adjacent to the diffuser element.

In the case of cell constructions in which the depolarizer-cathode is provided on one side of a duplex electrode, as in the example referred to above and illustrated in Fig. 4 of the drawing, where a steel sheet is coated on one side with zinc and on the opposite side with lead dioxide, the function of the diffuser element may be performed by the separator, and the use of a separate element as a diffuser may be avoided.

In the case where the depolarizer is not provided as one side of a duplex electrode, the diffuser element is required, and finely-divided metal oxide depolarizer, for example manganese dioxide, is provided in the diffuser and may have associated with it a material such as acetylene black which enhances its conductivity, as is conventional in dry cell practice. The depolarizer may be applied by dusting the element with the powdered oxide, or a slurry of the oxide in water may be applied, the diffuser then being dried after application of the slurry as in the case of the introduction of electrolyte-forming material in the separator. Generally, the diffuser element should contain 7% to 75% by weight of depolarizing oxide. When the depolarizer is included in the diffuser element, the cathode current collector need not perform the depolarizing function and may be any chemically inert, electronically conductive material. As indicated above, a conductive carbon coating is suitable. The conductive carbon paints conventionally used in the manufacture of duplex electrodes for conventional flat type batteries are entirely satisfactory for this purpose.

The cell of the invention may be activated by lateral diffusion of the activating gas from a reservoir such as the ampule 18 of Fig. 1 through the diffuser element. The gas reacts or co-ordinates with the electrolyte-forming material to produce ionically conductive electrolyte. For instance, boron trifluoride reacts with manganese chloride to form manganese difluoride and manganese chlorofluoride to release the water of hydration which then reacts with additional boron trifluoride to form hydrogen fluoride and boric acid, the hydrogen fluoride serving as electrolyte or forming fluoboric acid by reaction with the boric acid in which case fluoboric acid serves as electrolyte. During these reactions the separator element is wet by the released water of hydration. Reactions which are believed to summarize the phenomena which take place are set forth below:

$$MnCl_2 \cdot 4H_2O + 4BF_3 \rightarrow MnCl_2 \cdot 4BF_3 + 4H_2O$$
$$2MnCl_2 \cdot 4H_2O + BF_3 \rightarrow MnF_2 + MnClF + BCl_3 + 8H_2O$$
$$3H_2O + 4BF_3 \rightarrow 3HBF_4 + H_3BO_3$$

Cells made as described utilizing a steel-supported lead dioxide-zinc duplex electrode were tested at 75° F. The voltages obtained on different current drains (measured in milliamperes per square inch) are tabulated below:

*Table I*

Zn/PbO₂ CELLS ($MnCl_2 \cdot 4H_2O$ SALT)

| Current Density, ma./in.² | Cell Voltage |
|---|---|
| OCV [1] | 2.55 |
| 20 | 2.30 |
| 40 | 2.15 |
| 80 | 1.80 |

[1] OCV = Open circuit voltage.

For longer-lived cells a construction of the type shown in Fig. 2 of the drawing is preferred. In this type of construction the diffuser contains powdered metallic oxide to serve as depolarizer, and a duplex electrode composed of zinc having a conductive carbon coating on one side to serve as cathode current collector is used, the zinc of course being the anode of the cell. A number of cells made in this way utilizing manganese dioxide for the depolarizer, zinc for the anode, manganese chloride ($MnCl_2 \cdot 4H_2O$) as the electrolyte-forming salt and boron trifluoride as the activating gas have been tested at different temperatures and different current drains. Typical data obtained in such tests are set forth in Table II.

Table II
Zn/MnO₂ CELLS
(MnCl₂·4H₂O SALT)

| Current Density, ma./in.² | Cell Voltage at Temperatures Indicated | | |
|---|---|---|---|
| | +75° F. | −40° F. | −76° F. |
| OCV [1] | 2.00 | 1.95 | 1.85 |
| 10 | 1.70 | 1.55 | 1.10 |
| 20 | 1.50 | 1.25 | |
| 40 | 1.20 | .75 | |
| 80 | .80 | | |

[1] OCV=Open circuit voltage.

Under some conditions such as when it is desired that the cell be activated with the utmost dispatch, it may be desired that the separator used in the cell of the invention be wet rather than dry, yet the cell be inactive. By the construction shown in Fig. 3 this objective may be realized. In this case the diffuser element utilized is treated in a conventional manner to make it water proof e.g. by impregnation with a dilute lacquer solution so as to prolong the "shelf life" of the cell, but of course it must be permeable to gas. The separator and the depolarizer are both moistened, with water, and for low temperature use may contain a freezing point-depressant, but the cell is not activated until activating gas is supplied to the depolarizer. When the activating gas is admitted to the cell it provides ionically conductive electrolyte in the cell element and thereby permits cell action to take place.

The freezing point-depressant utilized in cells of the type just described may be any of those conventionally used in dry cells for low temperature use. The depolarizer, manganese dioxide, is in compressed powder form, and in accordance with conventional battery practice may and preferably does, contain in admixture therewith material such as acetylene black to improve electronic conductivity. The depolarizer element must of course be gas permeable. Illustrative of this embodiment of the invention, in a cell of the construction shown in Fig. 3 with a zinc anode and manganese dioxide depolarizer, the separator and depolarizer were wet with an aqueous solution containing by weight 12% zinc chloride and 30% lithium chloride. Upon activation of the cell with boron trifluoride satisfactory voltages were obtained at current drains as high as 160 milliamperes per square inch at temperatures from −76° F. to 165° F.

It will be evident that a large number of materials may be used to accomplish the objectives of the invention. Typical of the reactions which are believed to take place between organic materials and boron trifluoride which have produced satisfactory electrolytes in accordance with the invention are those set forth below:

$(COOH)_2 + BF_3 \longrightarrow (COOH)_2 \cdot BF_3$ (liquid electrolyte)
(Oxalic acid)

$(COOH)_2 \cdot 2H_2O + BF_3 \longrightarrow (COOH)_2 \cdot BF_3 + 2H_2O$
(Oxalic acid hydrate)

$3H_2O + 4BF_3 \longrightarrow 3HBF_4 + H_3BO_3$ $3(COOH)_2 + 4BF_3 \longrightarrow 3CO + 3CO_2 + 3HBF_4 + H_3BO_3$ $3H_2O + 4BF_3 \longrightarrow 3HBF_4 + H_3BO_3$ $C_6H_4(OH)_2 + BF_3 \longrightarrow (C_6H_4)_2O \cdot BF_3 + H_2O$ $3H_2O + 4BF_3 \longrightarrow 3HBF_4 + H_3BO_3$ Many tests have been made to substantiate the operability of cells embodying the various materials referred to herein. Typical of the results obtained are those set forth in the following table which lists the combinations of activating gas and electrolyte-forming materials used with particular depolarizers and the voltages obtained at the current drains indicated. All tests reported were conducted at room temperature, unless otherwise indicated. All tests were conducted using boron trifluoride as the activating gas except the last three which were made with silicon tetrafluoride. In the table, "OCV" means open circuit voltage, "C.D. ma./sq. in." means current drain in milliamperes per square inch, "PbO₂ (pl.)" means that the lead dioxide there used was electro-deposited. When not so designated, the lead dioxide was in powder form.

Table III

| Anode | Electrolyte | Depolarizer | OCV | C.D., ma./sq. in. | Voltage |
|---|---|---|---|---|---|
| Zn | AlCl₃·6H₂O | MnO₂ | 1.0 | 5 | 0.5 |
| Mg | Al(SO₄)·18H₂O | MnO₂ | 2.04 | 5 | 1.0 |
| Zn | Trichloro acetic acid | MnO₂ | 1.7 | 10 | [1]1.1 |
| Zn | Catechol | MnO₂ | 1.4 | 20 | 0.4 |
| Zn | Crotonic Acid | MnO₂ | 1.9 | 20 | 1.75 |
| Zn | Oxalic Acid | MnO₂ | 1.8 | 20 | 1.70 |
| Zn | p-hydroxy benzoic acid | MnO₂ | 1.7 | 10 | 1.30 |
| Zn | Phosphomolybdic acid | MnO₂ | 1.7 | 5 | 1.0 |
| Zn | MnCl₂·4H₂O | MnO₂ | 2.4 | 35 | 1.9 |
| Zn | Ba(OH)₂·8H₂O | MnO₂ | 1.85 | 20 | 1.1 |
| Mg | Ba(OH)₂ 8H₂O | MnO₂ | 2.8 | 10 | 2.5 |
| Zn | MnCl₂·4H₂O | PbO₂(pl.) | 2.55 | 20 | 2.2 |
| Zn | MnCl₂·4H₂O | PbO₂ | 2.2 | 20 | 1.9 |
| Mg | MnCl₂·4H₂O | PbO₂(pl.) | 2.7 | 20 | 2.2 |
| Al | MnCl₂·4H₂O | PbO₂(pl.) | 2.0 | 20 | 1.5 |
| Zn | CoCl₂·6H₂O | PbO₂(pl.) | 1.5 | 2 | 0.4 |
| Zn | NiCl₂·6H₂O | PbO₂(pl.) | 2.3 | 20 | 1.75 |
| Zn | FeCl₂·4H₂O | PbO₂(pl.) | 2.1 | 20 | 1.75 |
| Zn | NiSO₄·6H₂O | PbO₂(pl.) | 2.1 | 10 | 1.0 |
| Pb | FeCl₂·4H₂O | PbO₂(pl.) | 1.9 | 20 | 1.6 |
| Zn | Mg(NO₃)₂·6H₂O | PbO₂(pl.) | 2.15 | 10 | 1.9 |
| Zn | CaCl₂·6H₂O | PbO₂(pl.) | 1.4 | 4 | 1.0 |
| Zn | AlCl₃·6H₂O | PbO₂(pl.) | 2.15 | 10 | 1.2 |
| Zn | MgCl₂·6H₂O | PbO₂(pl.) | 2.20 | 20 | 1.5 |
| Ni | MnCl₂·4H₂O | PbO₂(pl.) | 1.5 | 2 | 0.5 |
| Cd | MnCl₂·4H₂O | PbO₂(pl.) | 1.85 | 10 | 1.0 |
| Zn | Na₄P₂O₇·10H₂O | PbO₂(pl.) | 2.3 | 20 | 2.0 |
| Zn | Na₃PO₄·12H₂O | PbO₂(pl.) | 2.3 | 10 | 1.5 |
| Zn | Al(NO₃)₃·9H₂O | PbO₂(pl.) | 2.35 | 10 | 1.8 |
| Mg | FeCl₂·4H₂O | PbO₂(pl.) | 2.6 | 20 | 2.0 |
| Fe | FeCl₂·4H₂O | PbO₂(pl.) | 2.1 | 20 | 1.8 |
| Zn | ZnF₂·4H₂O | PbO₂(pl.) | 2.8 | 20 | 2.6 |
| Pb | ZnF₂·4H₂O | PbO₂(pl.) | 1.7 | 10 | 1.4 |
| Zn | FeF₂·4H₂O | PbO₂(pl.) | 2.3 | 20 | 1.7 |
| Zn | FeCl₂·4H₂O | MnO₂ | 1.8 | 20 | 1.2 |
| Mg | MnCl₂·4H₂O | PbO₂(pl.) | 2.9 | 20 | 2.5 |
| Mg | Na₃PO₄·12H₂O | PbO₂(pl.) | 3.1 | 10 | 2.8 |
| Zn | Na₃PO₄·12H₂O | MnO₂ | 2.0 | 20 | 1.75 |
| Mn | MnCl₂·4H₂O | PbO₂ | 1.85 | 10 | 1.3 |
| Mg | MnCl₂·4H₂O | PbO₂ | 2.6 | 10 | 1.4 |
| Zn | ZnF₂·4H₂O | MnO₂ | 1.9 | 20 | 1.2 |
| Zn | ZnF₂·4H₂O | PbO₂ | 2.3 | 5 | 1.3 |
| Zn | Na₃PO₄·12H₂O | PbO₂ | 2.0 | 20 | 1.6 |
| Zn | H₂O(LiCl) | MnO₂ | 1.8 | 5 | 1.2 |
| Zn | Na₃PO₄·12H₂O | PbO₂ | 1.6 | 1 | 1.0 |
| Zn | MnCl₂·4H₂O | PbO₂ | 0.3 | | |

[1] Test at −40° F.

In all of the cell systems heretofore described, the anode electrode has been composed of sheet metal. It is of course well known that extended anode area can be obtained in a variety of ways such as by scarifying the sheet or by making the anode of a wire grid or screen. The most desirable way of providing extended anode area, however, is by the use of powdered metal.

Anodes of extended area are useful in cells embodying the invention, particularly in the cases where most rapid activation is desired and where operation at the very lowest temperatures is desired. For use in the invention such an anode may be fabricated by compressing powdered anode metal in admixture with finely-divided electrolyte-forming material and a binder such as paper fiber or other fiber of the types heretofore discussed.

For example, a very satisfactory anode can be made by compressing zinc powder, manganese dichloride (MnCl₂·4H₂O) and paper fibers, about 60% to 90% of the anode by weight being zinc, the remainder manganese dichloride with about 10% of the final anode being paper fiber as a binder. A number of tests have been made of cells containing an anode so prepared, a conventional paper separator and a depolarizer-cathode composed of manganese dioxide and finely-divided carbon. Results of tests conducted at −40° C. are set forth in Table IV, and by comparison with results obtained in tests of similar cells made with anodes of sheet zinc tested under the same conditions will show the improvement attained by the use of anodes of powdered metal.

Table IV
Zn/MnO₂ CELLS
(MnCl₂·4H₂O SALT)

| | Cell Voltage at Indicated Drain | | |
|---|---|---|---|
| | OCV[1] | C.D., 8 ma./in.[2] | C.D., 17 ma./in.[2] |
| Sheet anode | 1.95 | 1.40 | 0.90 |
| Powdered anode | 2.00 | 1.60 | 1.15 |

[1] OCV = Open circuit voltage.

From the foregoing description it will be apparent to those skilled in the art that the invention provides a primary galvanic cell of unusual flexibility eminently suited to use in applications where substantial energy is required quickly and under extreme conditions of temperature. Further, it will be evident that the invention encompasses a number of combinations and that those specifically discussed herein are described for purposes of illustrating the principles of the invention and not for limiting its scope.

This application is a continuation-in-part of application Serial No. 594,629, filed June 28, 1956, now abandoned.

We claim:

1. A deferred action, primary galvanic cell adapted to be activated by a gas selected from the group consisting of boron trifluoride and silicon tetrafluoride, which comprises a consumable metal anode selected from the group consisting of zinc, nickel, cadmium, lead, aluminum, iron, manganese, and magnesium; a metal oxide depolarizer; a bibulous separator permeable to gas and containing dry electrolyte-forming materials adapted to provide water upon reaction with said selected activating gas, said electrolyte-forming materials being electrically insulated from contact with an electrode of said cell until said activating gas is admitted thereto; and means providing access for said gas to said electrolyte-forming materials.

2. A cell as defined in claim 1 in which said anode has an extended surface area.

3. A cell as defined in claim 1 in which said electrolyte-forming material is an alkaline hydroxide.

4. A cell as defined in claim 1 in which said electrolyte-forming material is a hydrated inorganic salt.

5. A cell as defined in claim 4 in which said salt is a chloride.

6. A cell as defined in claim 1 in which said electrolyte-forming material is a saturated dicarboxylic acid of the formula HOOC—R—COOH where R is an alkyl radical containing up to 5 carbon atoms.

7. A cell as defined in claim 6 in which said acid is oxalic acid.

8. A cell as defined in claim 6 wherein R is an aryl radical containing up to 12 carbon atoms.

9. A deferred action, primary galvanic cell adapted to be activated by gaseous boron trifluoride, which cell comprises a zinc anode, a manganese dioxide depolarizer-cathode, a paper separator in contact with said zinc anode, and a gas diffuser element, said separator comprising a material capable of releasing water upon reaction with boron trifluoride, and said diffuser element providing access for boron trifluoride to said material.

10. A cell as defined in claim 9 in which said depolarizer is finely divided and is contained in said diffuser element.

11. A cell as defined in claim 9 in which said anode is of compressed powdered zinc and contains a portion of said material capable of releasing water.

12. A gas activated primary galvanic cell comprising a consumable metal anode; a bibulous paper separator adjacent thereto and in contact therewith, said separator containing the reaction product of a dry hydrated inorganic salt with at least one gaseous compound selected from the group consisting of boron trifluoride and silicon tetrafluoride; a diffuser element permeable to said gaseous compound adjacent to said separator, said element containing distributed therein metal oxide depolarizer, said depolarizer serving as the cathode of said cell; and a chemically inert, electronically conductive cathode current collector adjacent to and in contact with said diffuser element.

13. A cell as defined by claim 12 in which said anode is zinc, said depolarizer is manganese dioxide, and said cathode current collector is carbon.

14. A cell as defined by claim 12 in which said salt is manganese chloride (MnCl₂·4H₂O) and said activating gas is boron trifluoride.

15. A deferred action, primary galvanic cell adapted to be activated by at least one compound selected from the group consisting of boron trifluoride and silicon tetrafluoride comprising a consumable metal anode, a bibulous paper separator adjacent thereto and in contact therewith, said separator containing electrolyte forming materials and being moistened with water prior to activation of said cell; a porous metal oxide depolarizer adjacent to said separator; a water-proofed, electronically conductive gas-permeable diffuser element adjacent to said depolarizer and adapted to provide access for said activating gas to said electrolyte-forming materials; and a chemically inert, electronically conductive cathode current collector in contact with said diffuser element.

16. A cell as defined in claim 15 wherein said separator is moistened with an aqueous solution containing a freezing point depressant.

17. A cell as defined in claim 15 wherein said anode is zinc, said depolarizer is manganese dioxide, and said current collector is carbon and said cell is activated by boron trifluoride.

18. A deferred action, primary galvanic cell adapted to be activated by at least one gaseous compound selected from the group consisting of boron trifluoride and silicon tetrafluoride comprising a consumable metal anode carried on a metal sheet; a fibrous separator permeable to gas and in contact with said anode, said separator containing dry electrolyte-forming material adapted to provide water upon reaction with said activating gas; and a metal oxide depolarizer cathode in contact with said separator, said depolarizer-cathode being in sheet form and carried on a metal sheet.

19. A cell as defined in claim 18 wherein said anode is zinc and said depolarizer-cathode is lead dioxide.

20. A cell as defined in claim 19 wherein said electrolyte-forming material is hydrated manganese chloride (MnCl₂·4H₂O).

21. A deferred action battery adapted to be activated by at least one gas selected from the group consisting of boron trifluoride and silicon tetrafluoride comprising a plurality of cells as defined by claim 1 electrically interconnected in a hermetically sealed container; a vessel of activating gas within said container; and means within said container operable to rupture said vessel to activate said cells.

22. A battery as defined by claim 21 in which said cells are connected in series, each having a zinc anode, manganese dioxide depolarizer, and carbon cathode current collector, and in each of which the electrolyte-forming material is hydrated manganese chloride $$(MnCl_2 \cdot 4H_2O)$$

said battery being activated by boron trifluoride.

References Cited in the file of this patent
UNITED STATES PATENTS

| | | |
|---|---|---|
| 913,390 | Jungner | Feb. 23, 1909 |
| 1,359,881 | Emmanuel | Nov. 23, 1920 |
| 2,502,723 | Harriss | Apr. 4, 1950 |
| 2,576,266 | Ruben | Nov. 27, 1951 |
| 2,615,931 | Hatfield | Oct. 28, 1952 |
| 2,783,291 | Gold | Feb. 26, 1957 |

UNITED STATES PATENT OFFICE

CERTIFICATION OF CORRECTION

Patent No. 2,948,767                          August 9, 1960

Richard E. Johnson et al.

It is hereby certified that error appears in the above numbered patent requiring correction and that the said Letters Patent should read as corrected below.

Column 7, line 70, for "A gas" read -- A deferred action gas --.

Signed and sealed this 8th day of August 1961.

(SEAL)
Attest:

ERNEST W. SWIDER
Attesting Officer

DAVID L. LADD
Commissioner of Patents